(12) United States Patent
Santo et al.

(10) Patent No.: US 8,169,450 B2
(45) Date of Patent: May 1, 2012

(54) SYSTEM AND METHOD FOR AMBIENT-LIGHT ADAPTIVE INTENSITY CONTROL FOR AN ELECTRONIC DISPLAY

(75) Inventors: Hendrik Santo, San Jose, CA (US); Gurjit Thandi, San Jose, CA (US); Dilip Sangam, Saratoga, CA (US); Kien Vi, Palo Alto, CA (US)

(73) Assignee: Atmel Corporation, San Jose, CA (US)

( * ) Notice: Subject to any disclaimer, the term of this patent is extended or adjusted under 35 U.S.C. 154(b) by 964 days.

(21) Appl. No.: 11/805,522

(22) Filed: May 22, 2007

(65) Prior Publication Data
US 2008/0290803 A1    Nov. 27, 2008

(51) Int. Cl.
G09G 5/10 (2006.01)
(52) U.S. Cl. .................................................. 345/690
(58) Field of Classification Search .................. 345/690
See application file for complete search history.

(56) References Cited

U.S. PATENT DOCUMENTS

| | | | |
|---|---|---|---|
| 5,363,318 A | | 11/1994 | McCauley |
| 5,726,672 A | * | 3/1998 | Hernandez et al. ............ 345/22 |
| 6,094,185 A | * | 7/2000 | Shirriff .......................... 345/102 |
| 6,762,741 B2 | * | 7/2004 | Weindorf ....................... 345/102 |
| 6,844,881 B1 | * | 1/2005 | Chen et al. .................... 345/589 |
| 6,870,529 B1 | * | 3/2005 | Davis ............................. 345/207 |
| 7,456,829 B2 | * | 11/2008 | Fry ................................. 345/204 |
| 7,486,304 B2 | * | 2/2009 | Bergquist et al. ............. 345/690 |
| 7,515,160 B2 | * | 4/2009 | Kerofsky ....................... 345/600 |
| 7,636,076 B2 | * | 12/2009 | Hung et al. ....................... 345/88 |
| 2005/0068332 A1 | | 3/2005 | Diefenbaugh et al. |
| 2006/0023002 A1 | * | 2/2006 | Hara et al. ...................... 345/690 |
| 2006/0092182 A1 | * | 5/2006 | Diefenbaugh et al. ........ 345/690 |
| 2006/0284895 A1 | * | 12/2006 | Marcu et al. .................. 345/690 |
| 2007/0139405 A1 | * | 6/2007 | Marcinkiewicz ............. 345/207 |

OTHER PUBLICATIONS

Definition of gamma correction printed from http://dictionary.reference.com/browse/gamma+correction?r=66 Jan. 2010.*
International Search Report, PCT/US08/64269, mailed Sep. 1, 2008.

* cited by examiner

*Primary Examiner* — Nitin Patel
*Assistant Examiner* — Dorothy Harris
(74) *Attorney, Agent, or Firm* — Fish & Richardson P.C.

(57) ABSTRACT

The techniques of the present invention relate to automatically controlling display intensity. The present invention includes a calibration step in which the display intensity settings are correlated to the ambient light intensity conditions. The present invention also includes an automatic adjustment step in which the ambient light intensity is measured and the display intensity is automatically adjusted according to a correlation defined in the calibration step.

14 Claims, 7 Drawing Sheets

SYSTEM AND METHOD FOR AMBIENT-LIGHT ADAPTIVE INTENSITY CONTROL FOR AN ELECTRONIC DISPLAY

FIELD OF INVENTION

The present invention relates to electronic display technology, and particularly to controlling the intensity of light emitting diodes (LEDs) in the backlights of electronic displays.

BACKGROUND OF THE INVENTION

Backlights are used to illuminate thick and thin film displays including liquid crystal displays (LCDs). LCDs with backlights are used in small displays for cell phones and personal digital assistants (PDA), as well as in large displays for computer monitors and televisions. Typically, the light source for the backlight includes one or more cold cathode fluorescent lamps (CCFLs). The light source for the backlight can also be an incandescent light bulb, an electroluminescent panel (ELP), or one or more hot cathode fluorescent lamps (HCFLs).

The display industry is enthusiastically pursuing the use of LEDs as the light source in the backlight technology because CCFLs have many shortcomings: they do not easily ignite in cold temperatures, require adequate idle time to ignite, and require delicate handling. LEDs generally have a higher ratio of light generated to power consumed than the other backlight sources. So, displays with LED backlights consume less power than other displays. LED backlighting has traditionally been used in small, inexpensive LCD panels. However, LED backlighting is becoming more common in large displays such as those used for computers and televisions. In large displays, multiple LEDs are required to provide adequate backlight for the LCD display.

With the proliferation of inexpensive LCD displays of various sizes, displays are being used in a multitude of applications. For example, LCD displays are now commonly used in automotive applications in devices such as Global Positioning System (GPS) devices and entertainment systems like televisions and DVD players. A problem facing display manufactures is that the ambient lighting in which many displays are now used is dynamic. Ambient light can cause problems because ambient light intensity and ambient light color, or hue, affect the way a user perceives the image on the display. If the ambient light is very intense, the image on the display may appear dim to the user. If there is abnormally high amount of red light in the ambient light, the image on the display may appear too red to the user.

This problem is highlighted by the example of automotive applications. Both the intensity and hue of the ambient light vary greatly in automotive applications. Moreover, it is not normally feasible to compensate for low ambient light conditions by using an artificial light source since it could reduce the driver's visibility.

Moreover, many devices with LCD displays are portable and may be used in natural ambient light or in artificial ambient light. Natural ambient light and artificial ambient light may have different total intensities and different relative intensities of various hues. For example, incandescent bulbs may have different intensities of green or blue light than a fluorescent bulb. Further, the intensity of different hues of sunlight varies throughout the day. For example, the intensity of the red hue compared to the other hues in sunlight is higher at sunset than at midday in many areas. These variations in hue intensity can affect the perception of display color.

A further challenge for display manufacturers is that the display intensity preferences of different users at different ambient lighting conditions may vary. For example, a first user of a display may prefer a higher intensity at high ambient light intensity conditions than a second user at the same ambient light intensity conditions. Further, the preferences of each user for various display hue intensities may be different at different ambient hue intensities.

Display manufactures have traditionally addressed the above problems with a user intensity control. User intensity controls allow the user to manually increase or decrease the intensity of the display. FIG. 1 is a graphical representation of how this method for controlling display intensity works. A display may have a lower limit on the display intensity. This lower limit, or floor 100, is the lowest intensity the display can achieve. This may be a limitation of the display itself or a limitation of the illumination source or a limitation of driving circuitry for example. For some displays, this floor may be zero intensity or off, but other displays may have a non-zero lower intensity limit. Once the floor is reached, any further attempt to reduce the intensity of the display will not result in a decrease in display intensity. A display may also have an upper intensity limit, or ceiling 101. The intensity ceiling is the highest intensity the display allows. As with the floor, this may be a limitation of the display itself or a limitation of the illumination source or a limitation of driving circuitry for example. Once the intensity ceiling is reached, any further attempt to increase the intensity of the display will not result in an increase in the display intensity. The user intensity setting may also have an upper limit 103 and a lower limit 102. In the region between the floor 100 and ceiling 101 and in between the upper 103 and lower 102 limit of the user intensity setting, an increase in the user intensity setting results in an increase in the display intensity. The user of a display that employs this method must manually increase or decrease the user intensity setting to compensate for changes in perception of the display resulting from ambient light intensity changes.

A limitation of the above approach is that it requires manual adjustment. In display applications in which the ambient light intensity is constant, this limitation may not be significant. However, in applications in which the ambient light intensity is dynamic, this limitation may be significant. In the automotive applications discussed above, a user may have to adjust the display intensity several times throughout the day.

A further limitation of the above approach is that it does not easily compensate for changes in the intensity of hues of the ambient light. In some devices that employ the above approach, the display intensity for individual hues may also be adjusted. However, each hue must be individually adjusted. Adjusting multiple hue intensities several times a day can be cumbersome.

A second approach used by display manufactures to compensate for ambient light intensity changes is to incorporate an ambient light intensity sensor into the display and adjust the display intensity according to the sensor input. An example of this method is illustrated in FIG. 2. The display of FIG. 2 has a ceiling 201 and a floor 200. The ambient light sensor of the display in FIG. 2 has a lower limit 202 and an upper limit 203. The upper and lower limit of the ambient light sensor could be the largest and smallest amount of light detectable by the sensor respectively. When the display intensity is between the floor 200 and ceiling 201 and in between the upper 203 and lower 202 limit of the ambient light sensor, an increase in the ambient light intensity causes the display to increase the display intensity. The increase in display intensity is automatic and does not require user intervention. The increase in display intensity may be continuous 204 or the increase in display intensity may be a step-wise increase 205.

A hybrid approach has also been used. In this approach, the user may set nominal display intensity and a sensor in the display adjusts the display intensity with changes in ambient light intensity according to the method above. In a device that uses a continuous 204 increase, a hybrid approach would result in a correlation 206 between display intensity and ambient light intensity. The correlation 206 is shifted to the right or left from a nominal correlation 204 but still has the same slope, or shape if non-linear, as the original correlation 204.

A limitation of this method is that the correlations 204, 205, 206 between the ambient light and the display intensity are not defined by the user. Therefore, a user may set the nominal display intensity at a first ambient light condition but the resulting display intensity at a second ambient light condition may not be the optimal setting according to the user's preferences.

A further limitation of the above methods is that they do not allow for individual preferences of multiple users.

A further limitation of the above methods is that they do not automatically adjust the intensity of hues of the display based on the intensity of hues of the ambient light. The prior art methods adjust only the intensity of the display backlight and do not vary the hue of the light according to changes in the ambient hue.

The present invention provides innovative systems and methods for automatic display intensity adjustment that solve these limitations.

SUMMARY OF THE INVENTION

The techniques of the present invention relate to automatically controlling display intensity. The present invention includes a calibration step in which the display intensity settings are correlated to the ambient light intensity conditions. The present invention also includes an automatic adjustment step in which the ambient light intensity is measured and the display intensity is automatically adjusted according to a correlation defined in the calibration step.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
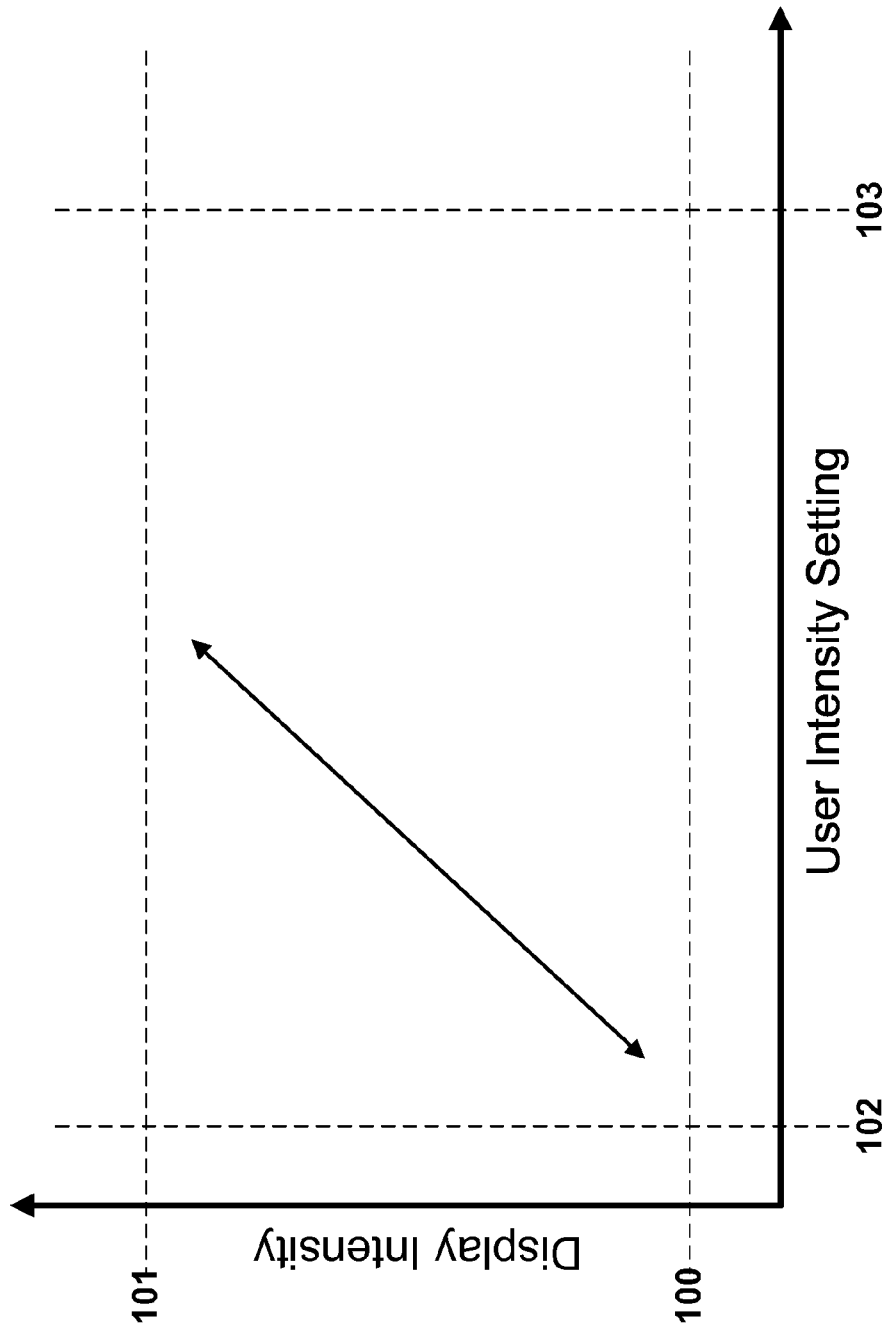
FIG. 1 illustrates the display intensity control achieved by a prior art technique for adjusting display intensity.
Figure 2:
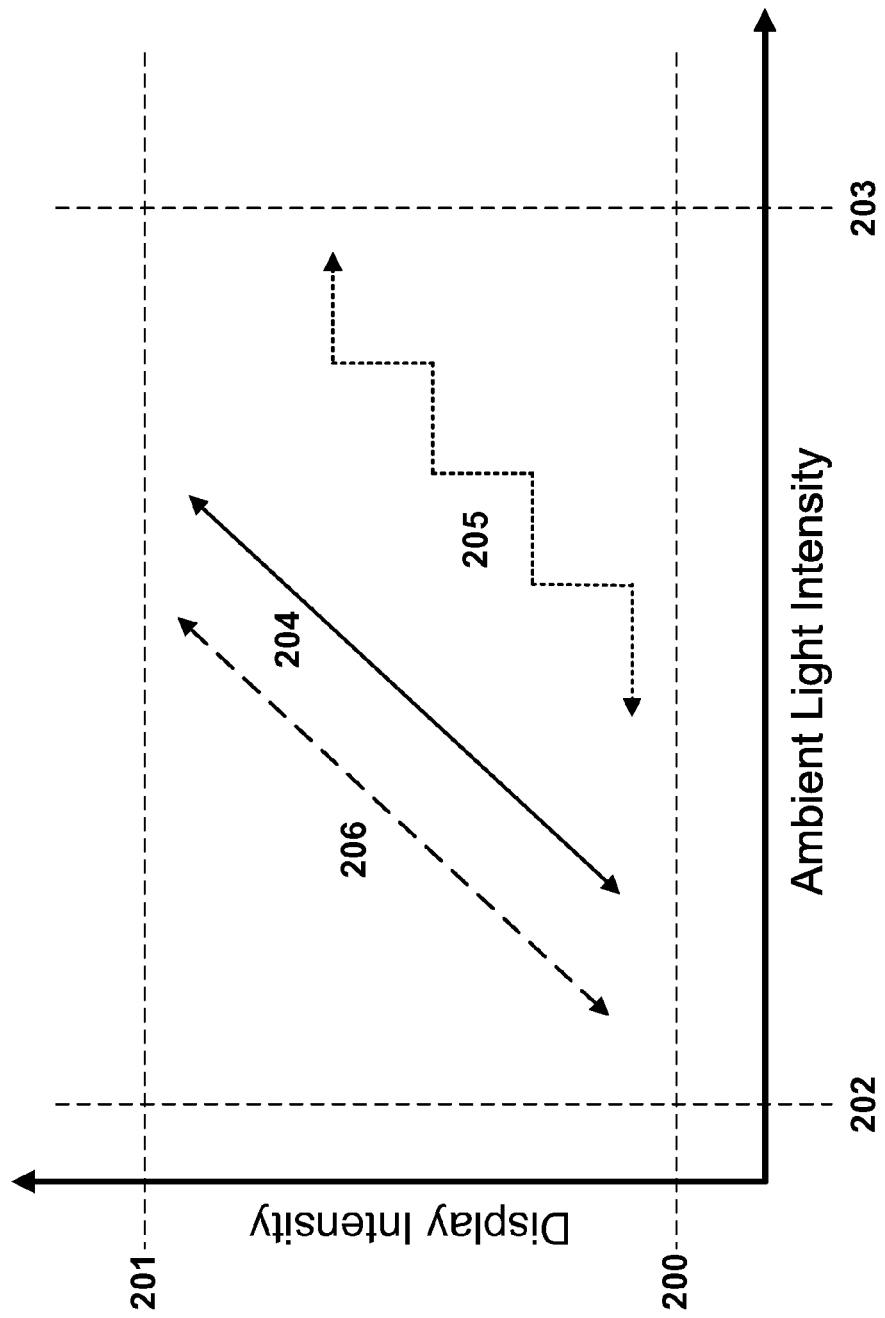
FIG. 2 illustrates the automatic display intensity achieved by another prior art technique for adjusting display intensity.

The present invention relates to automatically controlling the intensity of a display. FIG. 2 illustrates a prior art method of controlling the illumination of a display based on ambient light conditions. FIG. 2 also illustrates that the display may have an operating range between a floor 200 and a ceiling 201. FIG. 2 also shows that the ambient light intensity sensor may have an operating range between a lower limit 202 and an upper limit 203. For the present invention, a display and an ambient light intensity sensor may be chosen such the required display settings are within the operating range of the display and ambient light conditions are within the operating range of the sensor. The following illustrations of the display intensities of the present invention are within the operating range of the display and the sensor. It is understood that the present invention also applies to situations in which the operating conditions are outside the operating range of the display or the sensor.

Figure 3A:
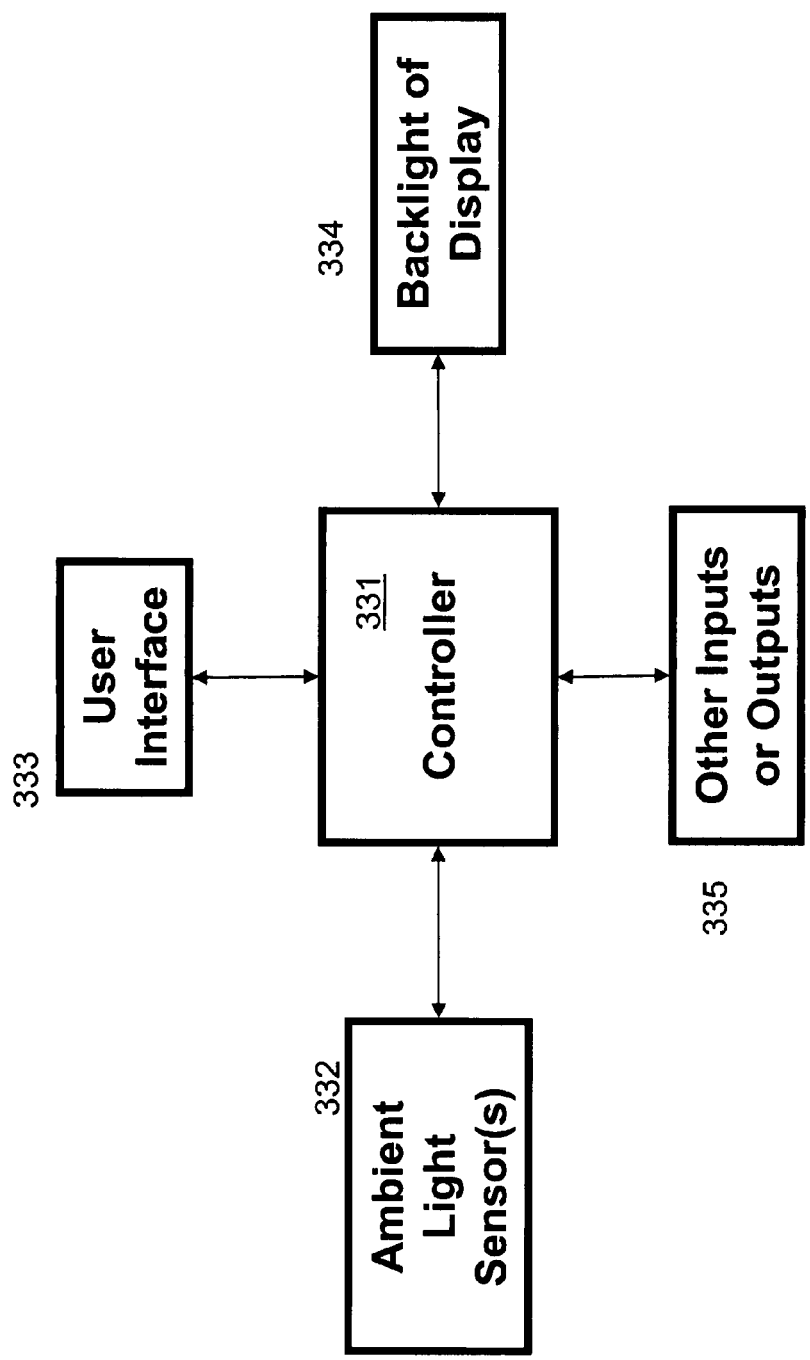
FIG. 3a illustrates a block diagram of an embodiment of the automatic display control system of the present invention.

FIG. 3a illustrates a block diagram of an embodiment of the automatic display control system of the present invention. A controller 331 receives information from a user interface 333, one or more ambient light sensors 332, and other input sources 335. The controller 331 may also receive information from the backlight of the display 334. The controller 331 may include a microprocessor and memory. The controller 331 may be incorporated into a single integrated circuit. The controller 331 may control the intensity by lowering the mean current in the display backlight by discrete or continuous control methods or may control the intensity by other means.

Figure 3B:
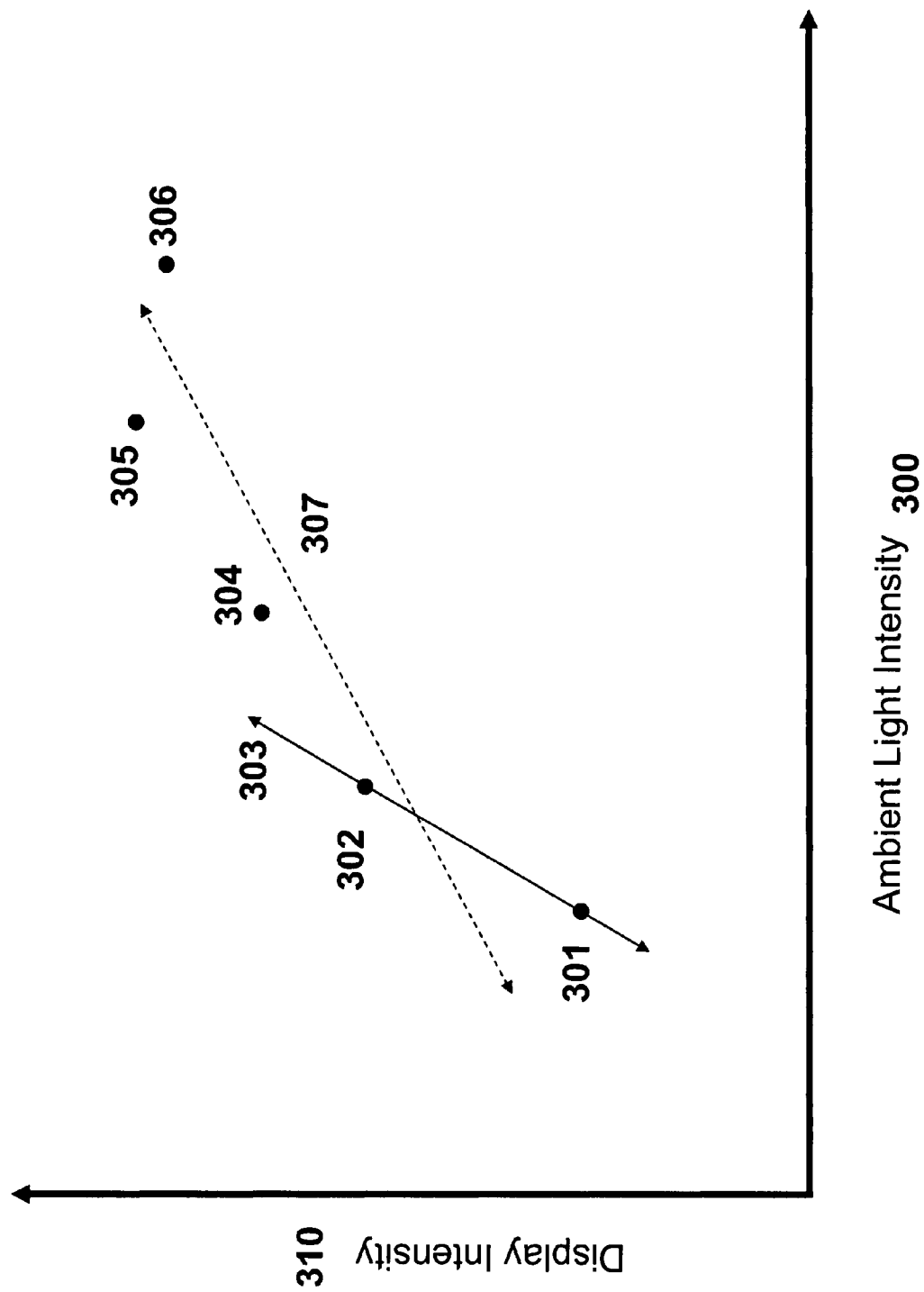
FIG. 3b illustrates the automatic display intensity achieved by exemplary embodiment of the present invention.

FIG. 3b illustrates the automatic display intensity achieved by an exemplary method of the present invention. In the present invention, one or more ambient light sensors 332 measure the ambient light intensity 300. The ambient light sensor 332 is calibrated according to the ambient light and perceived display intensity 310. The display may require entering a calibration mode to calibrate the sensor. At an ambient light intensity, a user of the display manually sets the display intensity (point 301). At another ambient light intensity, a user of the display manually sets the display intensity (point 302). These two points 301, 302 are used to correlate the display intensity to the ambient light intensity and determine a correlation 303. Once a correlation 303 is determined, the display intensity is automatically adjusted according to the correlation 303 when the ambient light intensity changes. If a user manually sets the display intensity 304, 305, 306 after a correlation is determined, the display may determine a new correlation 307. The new correlation 307 may be based on all manual settings entered 301, 302, 304, 305, 306 or some subset of these settings.

Figure 4:
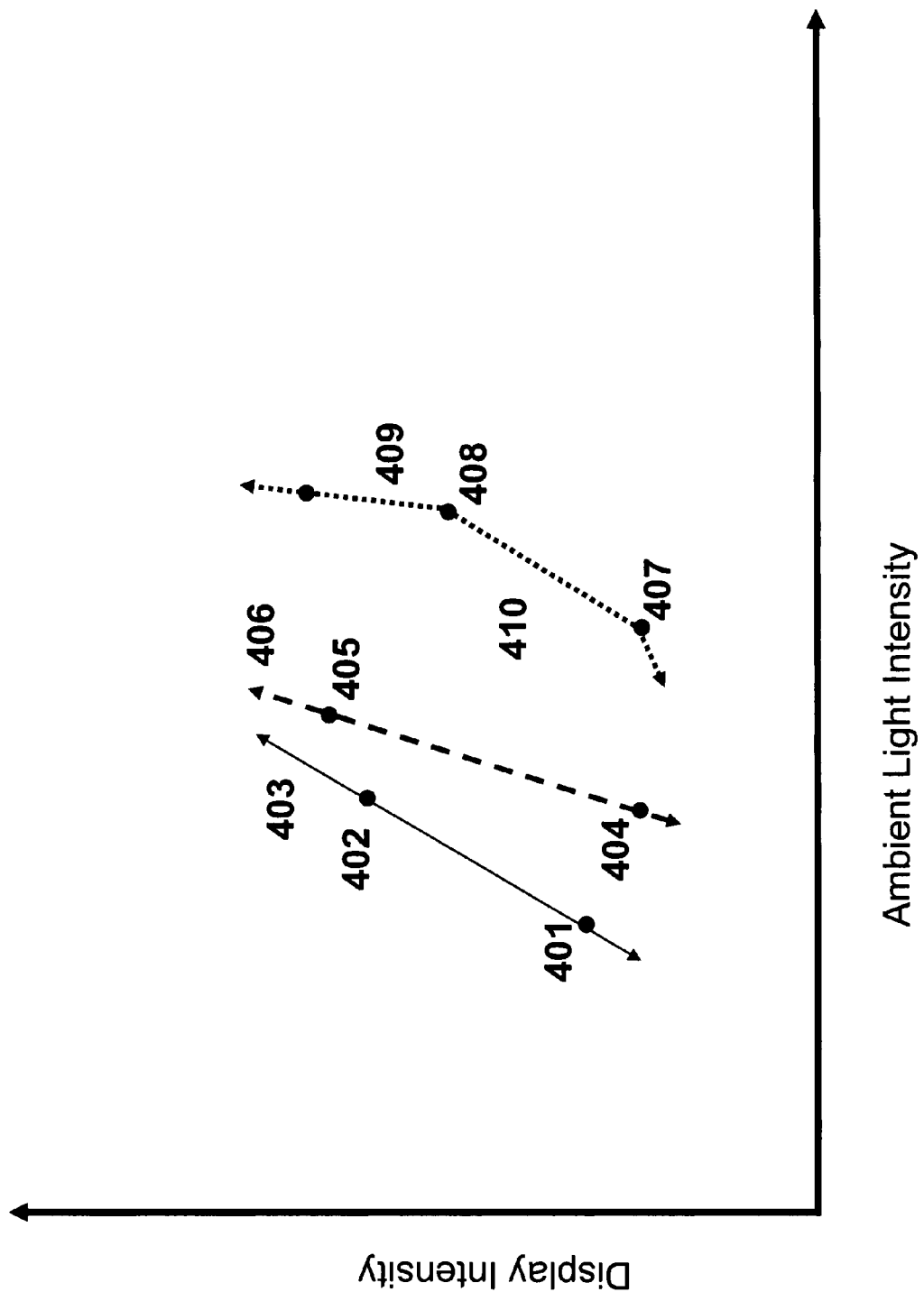
FIG. 4 illustrates the automatic display intensity achieved by another exemplary embodiment of the present invention.

The present invention may also have user-specific correlations. FIG. 4 illustrates the automatic display intensity achieved by an alternate exemplary method of the present invention with user-specific correlations. As used in this invention, a "user" refers to a distinct set of display intensity preferences. Distinct users do not have to be distinct individuals. For example a single individual may use different user correlations depending on whether or not the individual is wearing sunglasses.

The current user may be determined by input from the user interface 333 or from one of the other inputs 335. A first user may manually set the display intensity 401, 402 at two or more ambient light intensities. A correlation 403 between display intensity and ambient light intensity is determined for the first user. A second user may manually set the display intensity 404, 405 at two or more ambient light intensities. A correlation 406 between display intensity and ambient light intensity is determined for the second user. A third user may manually set the display intensity 407, 408, 409 at two or more ambient light intensities. A correlation 410 between display intensity and ambient light intensity is determined for the third user. The display then automatically adjusts the display intensity when the ambient light intensity changes according to the correlation 407, 408, 409 for the current user.

Figure 5:
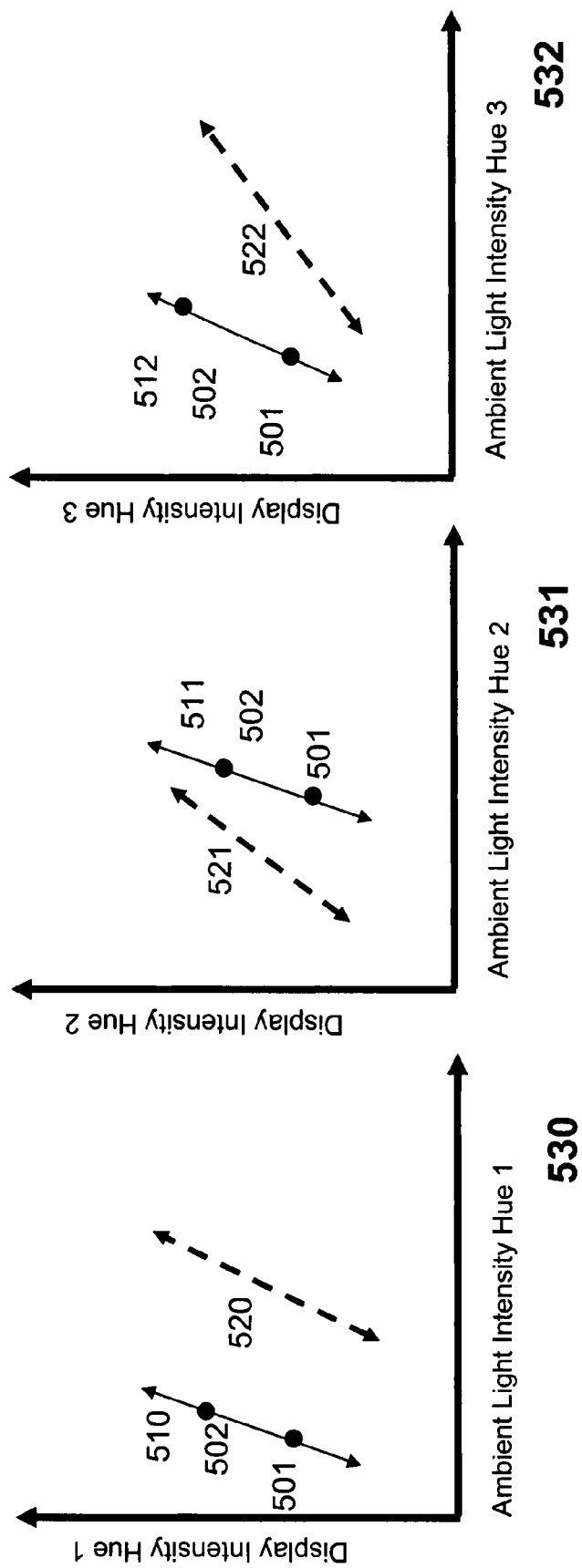
FIG. 5 illustrates the automatic display intensity achieved by another exemplary embodiment of the present invention.

The present invention may also have hue-specific correlations. The intensity of each hue of the ambient light can vary due to the source of the light. FIG. 5 illustrates the automatic display intensity achieved by an exemplary method of the present invention with hue-specific correlations. In this embodiment, the ambient light intensity of one or more specific hues 530, 531, 532 is measured. At two or more ambient light intensity conditions 501, 502 a user manually sets the display intensity for one or more of the display hues. From these manual settings 501, 502, correlations 510, 511, 512 between the ambient light intensity for a measured hues and the display intensity for a display hues are determined. When changes in the ambient light intensity for a hue are detected by the sensor, the display intensity for the display hue is adjusted according to the correlation for the hue. Other sets of correlations 520, 521, 522 may be generated for other users.

Figure 6:
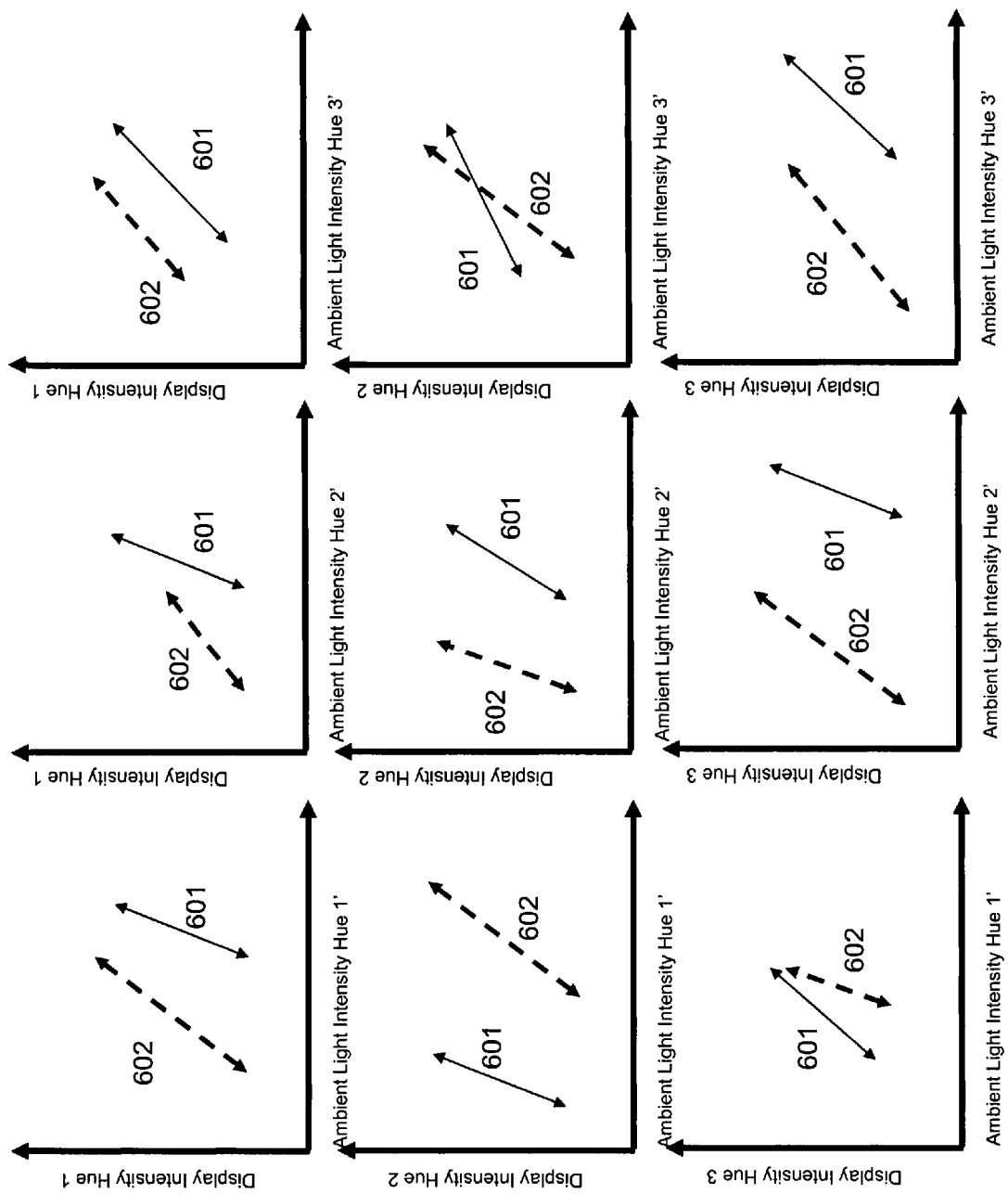
FIG. 6 illustrates the automatic display intensity achieved by another exemplary embodiment of the present invention.

The hues used by the display to define a color system do not necessarily have to be the same as the hues that are detected by the sensor or sensors. For example, the display may use the hues red, green, and blue when the sensor detects the hues cyan, magenta, and yellow. Also, the best correction for a change in a specific ambient hue intensity may not be to change the intensity of that specific hue in the display. For example, the preferred display correction to a change in the relative intensity of red light in the ambient light may be to adjust the display blue and or green intensity. FIG. 6 illustrates an exemplary embodiment in which correlations 601 for each display intensity hue may be functions of one or more of the measured ambient hue intensities. In FIG. 6, the color system used by the display is not necessarily the same as that used by the ambient hue sensors. The embodiment of FIG. 6 may have correlations specific to individual users. The second set of correlations 602 in FIG. 6 are for another user.

In one example, hue 1 can be red, hue 2 can be green and hue 3 can be blue. The first row of graphs in FIG. 6 show the display intensity correlations 601 and 602 for red as a function of the ambient light intensities for red, green and blue. The second and the third rows graphs provide similar information for the green and the blue hues respectively.

In displays that use red, blue, and green LEDs for backlight, the intensity of individual hues may be controlled by varying the current to the LEDs that produce red, blue, or green light respectively.

The correlations between display intensity and ambient light of the present invention may be linear correlations but are not limited to linear correlations and may be logarithmic, exponential, or another non-linear model fit to the set points.

One of ordinary skill in the art will appreciate that the techniques, structures and methods of the present invention above are exemplary. The present inventions can be implemented in various embodiments without deviating from the scope of the invention.

The invention claimed is:

1. A method for controlling a display, the method comprising:

recording preferred display hue intensity level settings for a user at a plurality of different measured ambient light hue intensity conditions, wherein the preferred display hue intensity level settings specify hue intensity levels for a first hue, and wherein the different measured ambient light hue intensity conditions are measured for a second hue different from the first hue;

calculating a correlation curve that correlates the preferred display hue intensity level settings for the user and the plurality of different measured ambient light hue intensity conditions;

measuring a current ambient light hue intensity condition for the second hue, the current ambient light hue intensity condition being distinct from any of the plurality of different measured ambient light hue intensity conditions; and automatically adjusting a display hue intensity level for the first hue by using the correlation curve and the current ambient light hue intensity condition for the second hue.

2. The method of claim 1, wherein the measuring is performed by a sensor contained in the display.

3. The method of claim 1, wherein the measuring is performed by a sensor external to the display.

4. The method of claim 1, wherein the automatically adjusting step further comprises the step of determining a current user.

5. The method of claim 1, wherein the calculating step includes the step of selecting the correlation curve from the group consisting of a linear correlation curve and a non-linear correlation curve.

6. The method of claim 1, the first hue comprising red.

7. The method of claim 1, the first hue comprising green.

8. The method of claim 1, the first hue comprising blue.

9. The method of claim 1, further comprising:

updating the user's preferred display hue intensity level settings by adding at least one preferred display hue intensity level setting;

in response to updating the user's preferred display hue intensity level settings, calculating a new correlation curve that correlates the updated user's preferred display hue intensity level settings and an updated plurality of different ambient light hue intensity conditions; and automatically adjusting the display intensity level for a new measured ambient light hue intensity condition by using the new correlation curve.

10. An apparatus for a display, the apparatus comprising:

means for recording a user's preferred display hue intensity level settings for a plurality of different measured ambient light hue intensity conditions, wherein the preferred display hue intensity level settings specify hue intensity levels for a first hue, and wherein the different measured ambient light hue intensity conditions are measured for a second hue different from the first hue;

means for calculating a correlation curve that correlates the user's preferred display hue intensity level settings and the plurality of different measured ambient light hue intensity conditions;

means for measuring a current ambient light hue intensity condition for the second hue, the current light hue intensity condition being distinct from any of the plurality of different measured ambient light hue intensity conditions; and means for automatically adjusting a display hue intensity level for the first hue by using the correlation curve and the current ambient light hue intensity condition for the second hue.

11. The apparatus of claim 10, wherein the means for measuring the current ambient light hue intensity condition comprises a sensor contained in the display.

12. The apparatus of claim 10, wherein the means for measuring the current ambient light hue intensity condition comprises a sensor external to the display.

13. The apparatus of claim 10, wherein the means for automatically adjusting includes means for determining a current user.

14. The apparatus of claim 10, wherein the correlation curve includes a linear correlation curve.

* * * * *